US008953222B2

(12) United States Patent
Kobayashi et al.

(10) Patent No.: US 8,953,222 B2

(45) Date of Patent: Feb. 10, 2015

(54) IMAGE FORMING APPARATUS, IMAGE FORMING METHOD, AND COMPUTER PROGRAM PRODUCT

(75) Inventors: Hiroaki Kobayashi, Tokyo (JP); Isamu Mitsuke, Kanagawa (JP); Takahiro Hirakawa, Kanagawa (JP); Saori Iura, Kanagawa (JP); Yuuichi Yoshida, Kanagawa (JP); Nobuyuki Iwata, Kanagawa (JP); Tomoyuki Takahira, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 433 days.

(21) Appl. No.: 13/309,803

(22) Filed: Dec. 2, 2011

(65) Prior Publication Data

US 2012/0147396 A1 Jun. 14, 2012

(30) Foreign Application Priority Data

Dec. 13, 2010 (JP) ................................ 2010-277296

(51) Int. Cl.

| | |
|---|---|
| ***H04N 1/60*** | (2006.01) |
| ***G03G 15/00*** | (2006.01) |
| ***G03G 21/04*** | (2006.01) |
| *G06K 1/00* | (2006.01) |

(52) U.S. Cl.

CPC ................ *G03G 15/50* (2013.01); *G03G 21/04* (2013.01); *G03G 15/5091* (2013.01)

USPC ......... 358/1.9; 358/3.05; 358/1.13; 358/1.15; 358/3.06; 358/518; 347/19; 347/5; 347/20

(58) Field of Classification Search

USPC ................................ 358/1.9, 3.05, 1.13, 1.15

See application file for complete search history.

(56) References Cited

U.S. PATENT DOCUMENTS

| | | | | |
|---|---|---|---|---|
| 7,341,323 | B2 * | 3/2008 | Tanaka | 347/15 |
| 7,742,185 | B2 * | 6/2010 | Lofthus et al. | 358/1.15 |
| 8,274,701 | B2 * | 9/2012 | Seibt | 358/1.9 |

FOREIGN PATENT DOCUMENTS

| | | |
|---|---|---|
| JP | 2009-113234 | 5/2009 |
| JP | 2009-269292 | 11/2009 |
| JP | 2010-046833 | 3/2010 |

OTHER PUBLICATIONS

Office Action dated Aug. 19, 2014, in JP Application No. 2010-277296.

* cited by examiner

*Primary Examiner* — Quang N Vo

(74) *Attorney, Agent, or Firm* — Oblon, Spivak, McClelland, Maier & Neustadt, L.L.P.

(57) ABSTRACT

An image forming apparatus includes a printer engine, a storage unit, a print data interpreting unit, and a print control unit. The print data interpreting unit interprets print data and identifies both a first job type and a second job type. The first job type specifies any one of a special print job using special toner and a normal job using normal toner, and the second job type specifies a print function to be used. The print control unit makes a decision to permit or prohibit accumulation of print data in view of security based on the first job type and the second job type, accumulates the print data in the storage unit when the decision to permit the accumulation of the print data is made, and prohibits the accumulation of the print data when the decision to prohibits the accumulation of the print data is made.

11 Claims, 12 Drawing Sheets

| | NORMAL PRINT | ACCUMULATION PRINT |
|---|---|---|
| MICR JOB | ACCUMULATION PROHIBITION | ACCUMULATION PROHIBITION |
| NORMAL JOB | ACCUMULATION PROHIBITION | ACCUMULATION PERMISSION |

| | NORMAL PRINT | CONFIDENTIAL PRINT | TEST PRINT | HOLD PRINT | STORED PRINT |
|---|---|---|---|---|---|
| MICR JOB | ACCUMULATION PROHIBITION | ACCUMULATION PROHIBITION | ACCUMULATION PROHIBITION | ACCUMULATION PROHIBITION | ACCUMULATION PROHIBITION |
| NORMAL JOB | ACCUMULATION PROHIBITION | ACCUMULATION PERMISSION | ACCUMULATION PERMISSION | ACCUMULATION PERMISSION | ACCUMULATION PERMISSION |

FIG.8

| | DOCUMENT NAME | JOB TYPE | ACCUMULATED DOCUMENT TYPE | PASSWORD | ACCUMULATED PRINT DATA FILE NAME |
|---|---|---|---|---|---|
| 1 | XXX.doc | NORMAL JOB | STORED DOCUMENT | NOTHING | XXX |
| 2 | YYY.ppt | MICR JOB | CONFIDENTIAL DOCUMENT | Abcdefg | YYY |
| 3 | ZZZ.txt | NORMAL JOB | HOLD DOCUMENT | NOTHING | ZZZ |
| 4 | | | | | |

FIG.9

| | NORMAL PRINT | CONFIDENTIAL PRINT | TEST PRINT | HOLD PRINT | STORED PRINT |
|---|---|---|---|---|---|
| MICR JOB | ACCUMULATION PROHIBITION | ACCUMULATION PERMISSION | ACCUMULATION PROHIBITION | ACCUMULATION PERMISSION | ACCUMULATION PROHIBITION |
| NORMAL JOB | ACCUMULATION PROHIBITION | ACCUMULATION PERMISSION | ACCUMULATION PERMISSION | ACCUMULATION PERMISSION | ACCUMULATION PERMISSION |

FIG.12

| | MICR TONER | NOMAL TONER |
|---|---|---|
| MICR TONER | PRINT PERMISSION | PRINT PROHIBITION |
| NORMAL JOB | PRINT PROHIBITION | PRINT PERMISSION |

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-277296 filed in Japan on Dec. 13, 2010.

BACKGROUND OF THE INVENTION

1. Field of the Invention

The present invention relates to an image forming apparatus, an image forming method, and a computer program product, which support security print such as check print.

2. Description of the Related Art

Conventionally, as an image forming apparatus which can support security print, magnetic ink character recognition (MICR) printers used to print checks are known. The MICR printers are required to have the functionality capable of preventing unauthorized use, forgery and copy of checks because the checks are cash vouchers. The followings are representative measures to the above problem.

(1) In order to produce a valid check, MICR toner (magnetic toner), an MICR font, and check paper are necessary. Thus, unauthorized use of such resources is prohibited.

(2) A special dedicated command is embedded in a job for printing a check, and the job which includes this dedicated command is called “MICR job”. The resources mentioned above are permitted for use only on the MICR job.

(3) If the MICR job remains in a hard disk drive (HDD), it may be exposed to unauthorized use or forgery. In this case, an accumulated document print function is disabled.

In the past, the above measures were taken, and as a result MICR printers have been used as dedicated printers only to be used for MICR print.

Meanwhile, since check printing is a basic job for banks (including branches), at least two MICR printers including a backup printer need to be installed in order to be prepared for trouble. However, since typical work can be sufficiently performed using one printer, the users have the following demands.

(1) It is desired that the backup printer is not a dedicated printer which is used only for MICR print but a general multi-function printer (MFP) which can be used for typical office works so that the backup printer may be used for normal office work. The backup MFP may be configured such that it can be used for MICR print in a way of exchanging an all-in-one (AIO) toner cartridge as necessary.

(2) Since the MICR printer is not equipped with the accumulated document print function due to security problems, it is desired to use the accumulated document print function in the backup MFP.

As a method which meets the above desires, for example, the following methods have been used.

(1) As a method employed in existing products, the accumulated print function (confidential print, test print, hold print, or stored print) using an HDD is not permitted, and when there is an attempt to accumulate a MICR job or a normal job, the corresponding job is canceled. Further, provided is a mode requiring a password to be input through a device panel before a MICR job is printed and output, and of then printing the MICR job. In such products, processing is performed in the order that jobs are input to the device (that is, selecting a document is not allowed and jobs are output starting from the job at the top).

Here, the confidential print refers to a print function of enabling printing through user authentication performed by using a password input from an operating panel of a printer. The test function refers to a print function of printing only one copy under a set condition and then printing the remaining copies under the set condition after a print result has been checked. The hold print refers to a print function of temporarily storing a document, which a host has instructed a printer to print, in a hard disk and of then printing the document when a print start instruction is given from an operating panel by a user. The stored print refers to a print function of storing print data continuously even after printing.

(2) Japanese Patent Application Laid-open No. 2009-269292 discloses an image forming apparatus that classifies MICR jobs into two types, that is, an MICR job that requires an input of a password from a device panel and an MICR job that does not require an input of a password, for the purpose of improving a user’s convenience by permitting accumulation of the MICR jobs. The MICR job that requires an input of a password is accumulated in an HDD so as to allow printing of the subsequent job, whereas the MICR job that does not require the input of a password is printed as is. The MICR job accumulated in the HDD can be selected through a device panel at arbitrary timing, and printed.

However, in the method of canceling the print job if an attempt to accumulate the MICR job and the normal job is made, there is a disadvantage in that the use of the job cancellation function is not permitted even in normal print. Further, in the method disclosed in Japanese Patent Application Laid-open No. 2009-269292, since data is accumulated in the HDD, printing may possibly be performed many times. In addition, when there is a password leak and an accumulated job was not erased, there is a risk that the job will be printed without authorization. Furthermore, when a printer body or the HDD is stolen or there is a leak of accumulated data, there is a risk that they will be used for forgery of checks or the like.

There is a need that the accumulation function can be used in an image forming apparatus while preventing unauthorized use of a special print job such as an MICR job.

SUMMARY OF THE INVENTION

It is an object of the present invention to at least partially solve the problems in the conventional technology.

An image forming apparatus includes a printer engine, a storage unit, a print data interpreting unit, and a print control unit. The print data interpreting unit interprets print data and identifies both a first job type and a second job type. The first job type specifies any one of a special print job using special toner and a normal job using normal toner, and the second job type specifies a print function to be used. The print control unit makes a decision to permit or prohibit accumulation of print data in view of security based on the first job type and the second job type, accumulates the print data in the storage unit when the decision to permit the accumulation of the print data is made, and prohibits the accumulation of the print data when the decision to prohibits the accumulation of the print data is made.

An image forming method, which is performed in an image forming apparatus including a print data interpreting unit, and a print control unit, includes: interpreting print data and identifying both a first job type and a second job type by the print data interpreting unit, the first job type specifying any one of a special print job using special toner and a normal job using normal toner, and the second job type specifying a print function to be used; and making a decision to permit or prohibit accumulation of print data in view of security based on the first job type and the second job type, accumulating the print data in a storage unit when the decision to permit the accumulation of the print data is made, and causing a printer engine to perform printing when the decision to prohibit the accumulation of the print data is made, by the print control unit.

A computer program product includes a non-transitory computer-readable medium having computer-readable program codes embodied in the medium. The program codes when executed cause a computer used in an image forming apparatus to execute: interpreting print data and identifying both a first job type and a second job type, the first job type specifying any one of a special print job using special toner and a normal job using normal toner, and the second job type specifying a print function to be used; and making a decision to permit or prohibit accumulation of print data in view of security based on the first job type and the second job type, accumulating the print data in a storage unit when the decision to permit the accumulation of the print data is made, and causing a printer engine to perform printing when the decision to prohibit the accumulation of the print data is made.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of accumulated document management information;

FIG. 9 is a diagram illustrating another example of an accumulation permission/prohibition table used for making a decision to permit or prohibit the accumulation of print data when a job type is classified into two types of MICR job and normal job, and an accumulation job type is classified into five types of normal print, confidential print, test print, hold print, and stored print;

FIG. 12 is a diagram illustrating an example of a print permission/prohibition table;

DETAILED DESCRIPTION OF THE PREFERRED EMBODIMENTS

Hereinafter, exemplary embodiments of an image forming apparatus according to the present invention will be described in detail with reference to the accompanying drawings.

Basic (common) features of embodiments (various embodiments) described below lie in that in a process performed when an image forming apparatus capable of supporting MICR print receives a job for accumulating print data from a host computer, a decision to permit or prohibit accumulation of image data is made based on a job type and an accumulation job type, unlike the conventional method in which a decision to unconditionally permit the accumulation of the image data or cancel the job for accumulating the image data is made.

Figure 1:
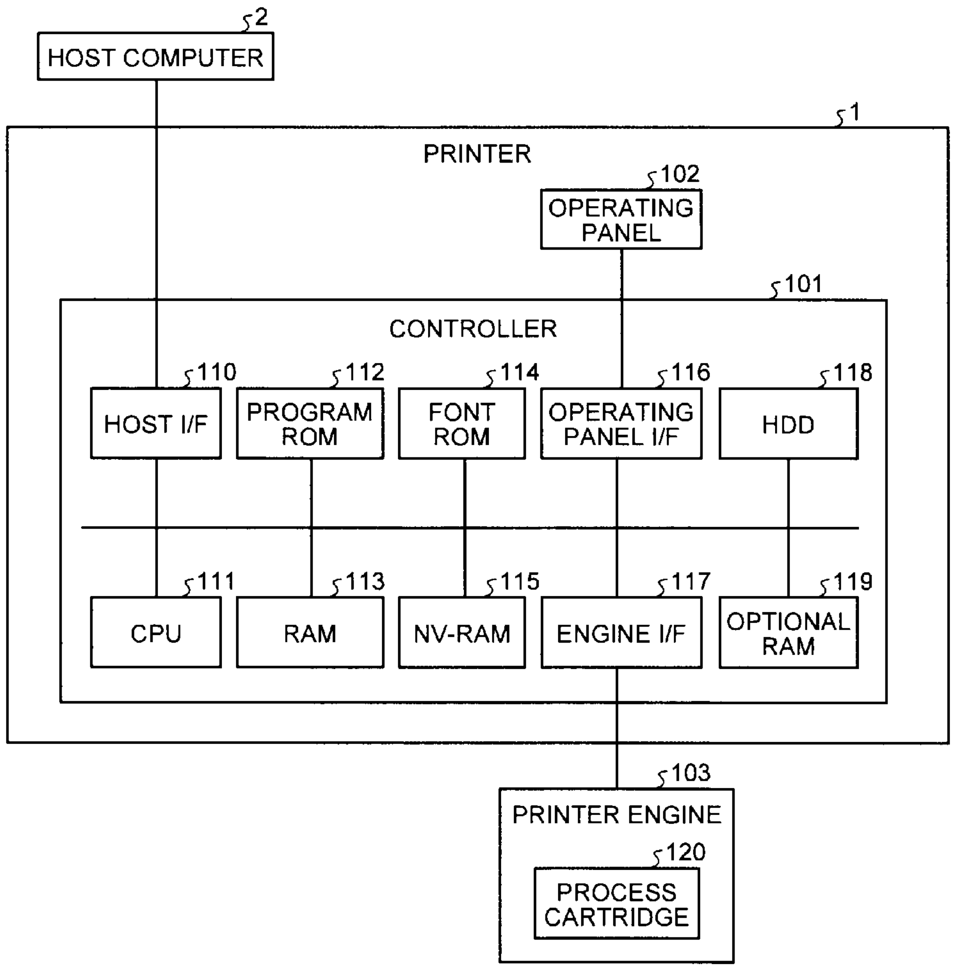
FIG. 1 is a block diagram illustrating a hardware configuration of a laser printer.

First, a hardware configuration of a laser printer according to the present embodiment will be described with reference to FIG. 1. FIG. 1 is a block diagram illustrating a hardware configuration of a laser printer.

A laser printer 1 (hereinafter, referred to as “printer 1”) includes a controller 101, an operating panel 102, and a printer engine 103. The printer 1 is connected with a host computer 2 such as a personal computer (PC) and receives a print job or the like from the host computer 2. The host computer 2 transmits print data to the printer 1 and requests the printer 1 to print the print data. In particular, when MICR print is performed, the host computer 2 generates print data composed of character print data and print control data including a command for instructing MICR print and various setting values, and transmits the print data to the printer 1 as a MICR job.

The controller 101 functions as an output unit that converts (renders) the character print data from the host computer 2 into image data (bitmap data) according to an operating mode set at the point of activation and the print control data from the host computer 2, and outputs the image data to the printer engine 103. The controller 101 may be configured with modules, which will be described later.

The operating panel 102 includes a display unit using a liquid crystal (LC) panel for displaying a status of the printer 1 and an input unit using a touch panel for allowing a user to change an operating mode, a font, or the like of the printer 1 or to input a password.

The printer engine 103 includes a process cartridge 120. The process cartridge 120 is a single product that includes therein a photosensitive element, a charging unit, an exposing unit, a developing unit, a transfer unit, a cleaning unit, a neutralization unit, and the like. The process cartridge 120 is removable from or attachable to the printer 1. The printer engine 103 is a so-called electrophotography image forming unit that forms an image on a transfer paper by generating an electrostatic latent image on the photosensitive element of the process cartridge 120 according to a control signal from the controller 101 and the image data, developing the electrostatic latent image, feeding a transfer paper through a paper feeding unit, transferring the developed image onto the transfer paper, and fixing the transferred image. The printer engine 103 may have a configuration using a toner cartridge other than the process cartridge 120. In this case, the printer engine 103 is configured such that a photosensitive element, a charging unit, an exposing unit, a developing unit, a transfer unit, a cleaning unit, a neutralization unit, and the like are provided as components separate from the toner cartridge.

Here, a description will be made in connection with modules included in the controller 101.

A host I/F 110 is an interface that receives print data (including print control data and character print data) transmitted from the host computer 2 to the printer 1 as a print job, and transmits a status signal from the printer 1 to the host computer 2. In the present embodiment, page description language (PDL) data is used as an example of the print data.

A central processing unit (CPU) 111 processes the print data from the host computer 2 according to a control program stored in a program read only memory (ROM) 112.

The program ROM 112 stores the control program that causes the CPU 111 to control data in the controller 101 or to control peripheral modules in general.

A random access memory (RAM) 113 is used as a work memory used when the CPU 111 executes various kinds of processes, a buffer that manages the print data from the host computer 2 in units of pages and temporarily stores the print data, or used as a bitmap memory (a memory for image or a memory for expansion) that stores therein mage data (print pattern) converted from the character print data.

A font ROM 114 stores various kinds of font data used for printing.

A nonvolatile random access memory (NV-RAM) 115 stores data, which is desired to store even when power is turned off, such as a predetermined setting value set via the operating panel 102, predetermined print control information, accumulated document management information which will be described later, and the like, which are used for print control.

An operating panel I/F 116 is an interface that allows the controller 101 to exchange signals with the operating panel 102 so a user is able to cause the status of the printer 1 to be displayed or to change an operating mode or a font through the operating panel 102.

An engine I/F 117 is an interface for transmitting a control signal from the controller 101 to the printer engine 103 and receiving a status signal transmitted from the printer engine 103 to the controller 101.

An HDD 118 is a hard disk functioning as a nonvolatile storage unit and is used for various purposes. For example, the HDD 118 may be used for accumulating print data from the host computer 2 or for accumulating or storing bitmap data converted from character print data, or may be used as a buffer for temporary storage or as a work area.

An optional RAM 119 is a removable RAM for supplementing the RAM 113.

In the printer 1 having the above configuration, print data (PDL data) transmitted from the host computer 2 via the host I/F 110 is separated into character print data, print control data, and the like by the CPU 111. The character print data and the print control data are converted into image data (bitmap data) and a control code internally used in the printer 1, respectively, and then stored in the HDD 118 or the RAM 113. At this time, when a print job or print data from the host computer 2 exceeds one page, the controller 101 first converts an intermediate code generated from the character print data into image data, and outputs a print start command to the printer engine 103 via the engine I/F 117 when the conversion is completed. Then, the printer engine 103 starts printing in response to the command.

Through such a series of flows, the print data from the host computer 2 is printed by the printer engine 103 of the printer 1.

Next, a description will be made in connection with a functional configuration of the printer 1 that operates according to the control program.

Figure 2:
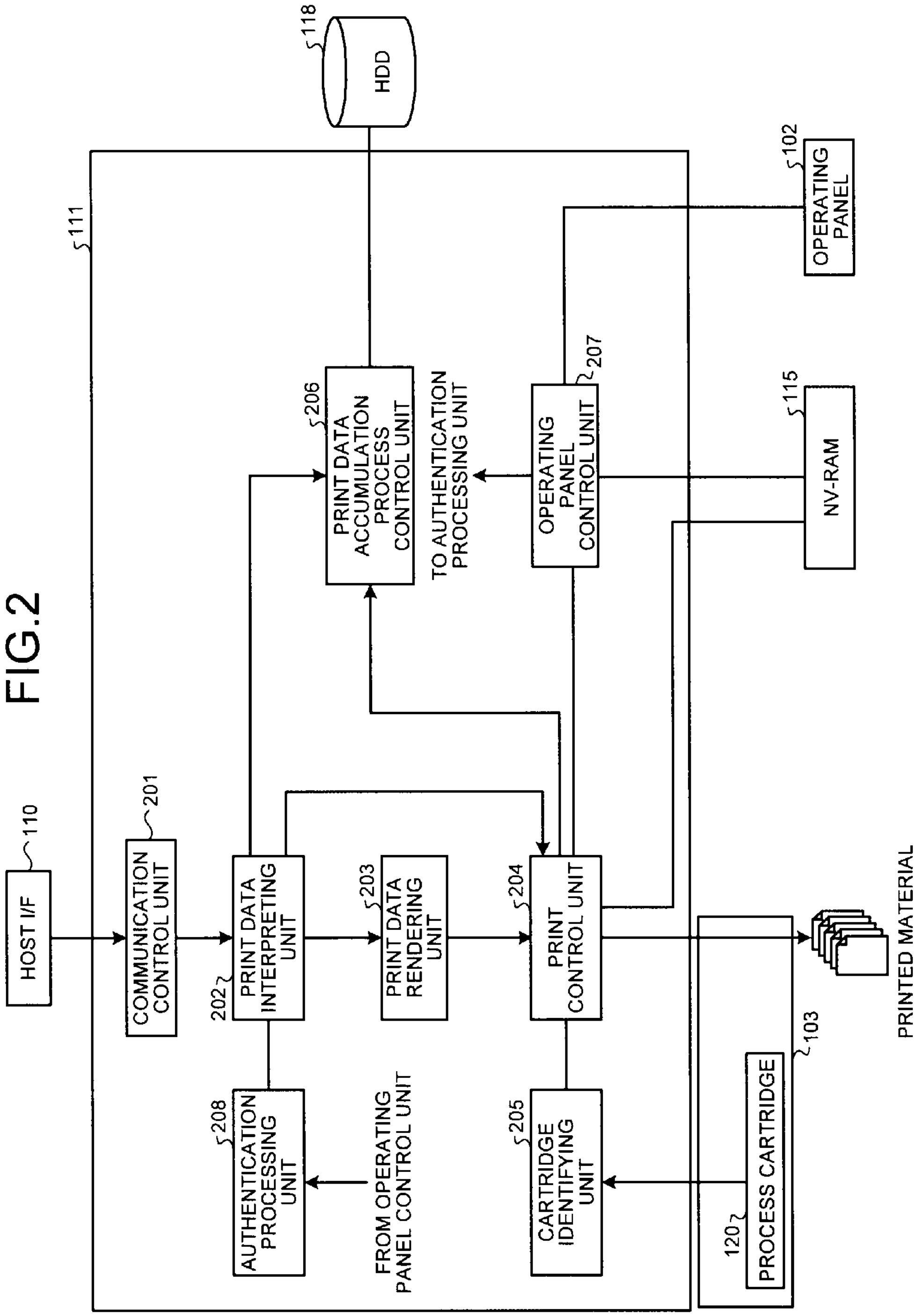
FIG. 2 is a schematic diagram schematically illustrating a first functional configuration of a printer related to an image forming process.

FIG. 2 is a schematic diagram schematically illustrating a first functional configuration of the printer 1 related to an image forming process. As illustrated in FIG. 2, the CPU 111 of the printer 1 functions as a communication control unit 201, a print data interpreting unit 202, a print data rendering unit 203, a print control unit 204, a cartridge identifying unit 205, a print data accumulation process control unit 206, an operating panel control unit 207, and an authentication processing unit 208 according to the control program. The above functional units cooperate with the components of the printer 1.

The communication control unit 201 controls the transmission and reception of signals between the printer 1 and the host computer 2 via a communication line such as a local area network (LAN) cable or a universal serial bus (USB) cable.

The print data interpreting unit 202 interprets the PDL print data transmitted from the host computer 2, and identifies both a job type and an accumulation job type. When the print data interpreting unit 202 recognizes a command representing an MICR job included in the print data, the print data interpreting unit 202 identifies the job type as an MICR job. When the command representing an MICR job is not included in the print data, the print data interpreting unit identifies the job type as a normal job. The print data interpreting unit 202 recognizes a designation command of an accumulated document (a confidential print document, a test print document, a hold print document, or a stored print document), and identifies an accumulation job type (confidential print, test print, hold print, or stored print). The print data interpreting unit 202 notifies the print control unit 204 of both identification results. Further, when a print data accumulation process is performed by the print data accumulation process control unit 206, the print data interpreting unit 202 transfers the print data to the print data accumulation process control unit 206.

The print data rendering unit 203 generates bitmap data (image data) based on the print data (the PDL data) to be printed.

The print control unit 204 performs the print controls so that the printer engine 103 forms an image, which corresponds to the bitmap data generated by the print data rendering unit 203, on a transfer paper and then outputs the printed material. At this time, the print control unit 204 performs the controls for causing the print data accumulation process control unit 206 to perform an accumulation of the print data (which may be hereinafter referred to as "document accumulation") or the printer engine 103 to print the print data according to the job type and the accumulation job type transferred from the print data interpreting unit 202 as described below. The print control unit 204 controls a print operation or an error stop operation according to the type of toner in the currently mounted process cartridge 120, which is identified by the cartridge identifying unit 205 which will be described below. The detail of control by the print control unit 204 will be described later.

The cartridge identifying unit 205 acquires an attribute of the process cartridge 120 from the printer engine 103 (for example, the cartridge identifying unit 205 may acquire the attribute information from an ID chip included in the process cartridge 120), and then identifies the type of toner charged in the process cartridge 120.

The print data accumulation process control unit 206 accumulates the print data (document) in the HDD 118, reads the print data from the HDD 118, and erases the print data accumulated in the HDD 118.

The operating panel control unit 207 performs the controls for displaying a screen, such as an accumulated document selection screen or a password input screen, on the operating panel 102, or performs the controls for storing each setting value set via the operating panel 102 in the NV-RAM 115.

When the print data interpreting unit 202 interprets the print data and then identifies the accumulation job type as any of the confidential print or the hold print jobs, the authentication processing unit 208 compares a password included in the print data with a password input from the operating panel 102 by the user. When the two passwords match with each other, the authentication processing unit 208 performs an authentication process permitting the confidential print or the hold print.

Figure 3:
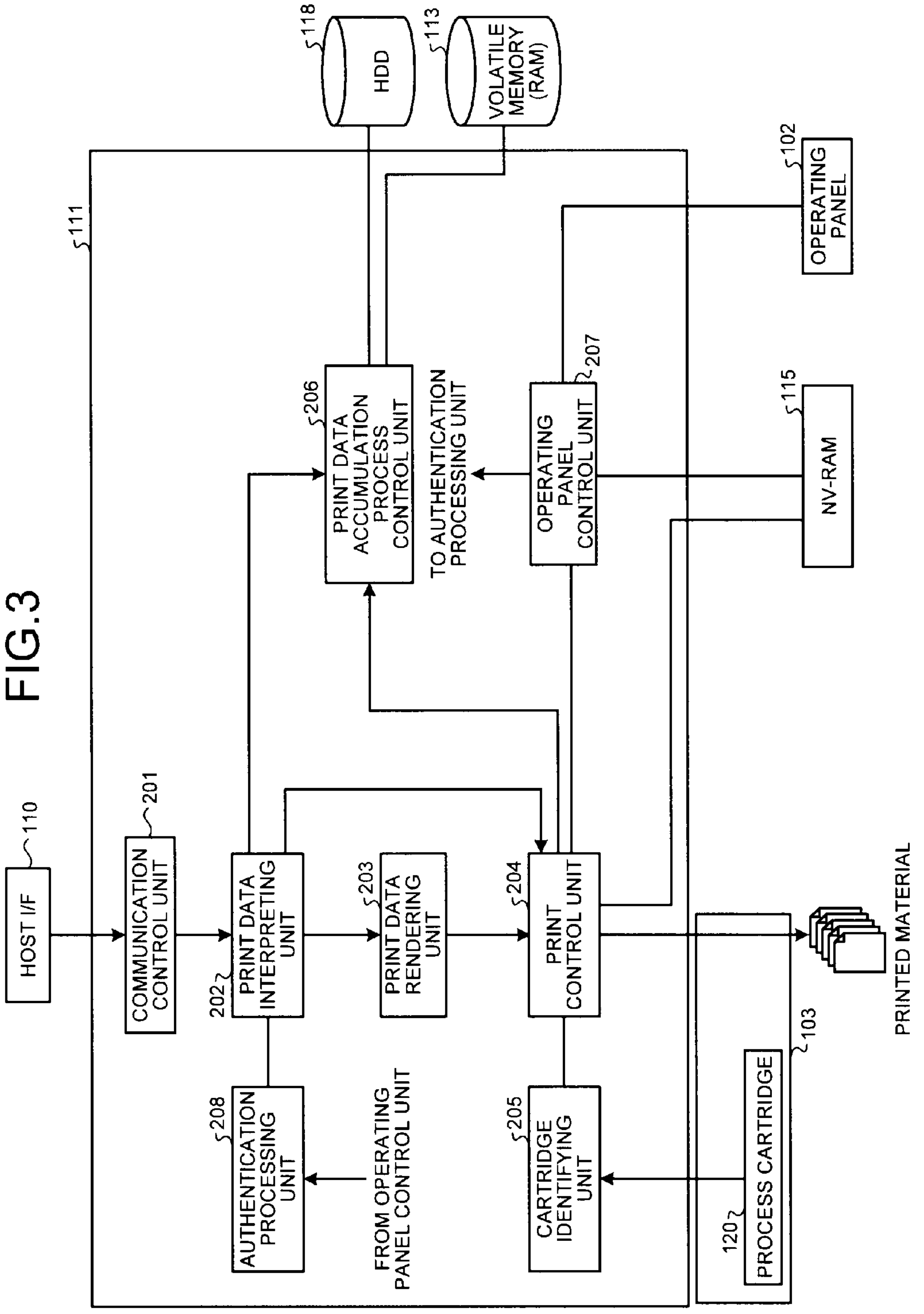
FIG. 3 is a schematic diagram schematically illustrating a second functional configuration of a printer related to an image forming process.
Figures 4, 5:
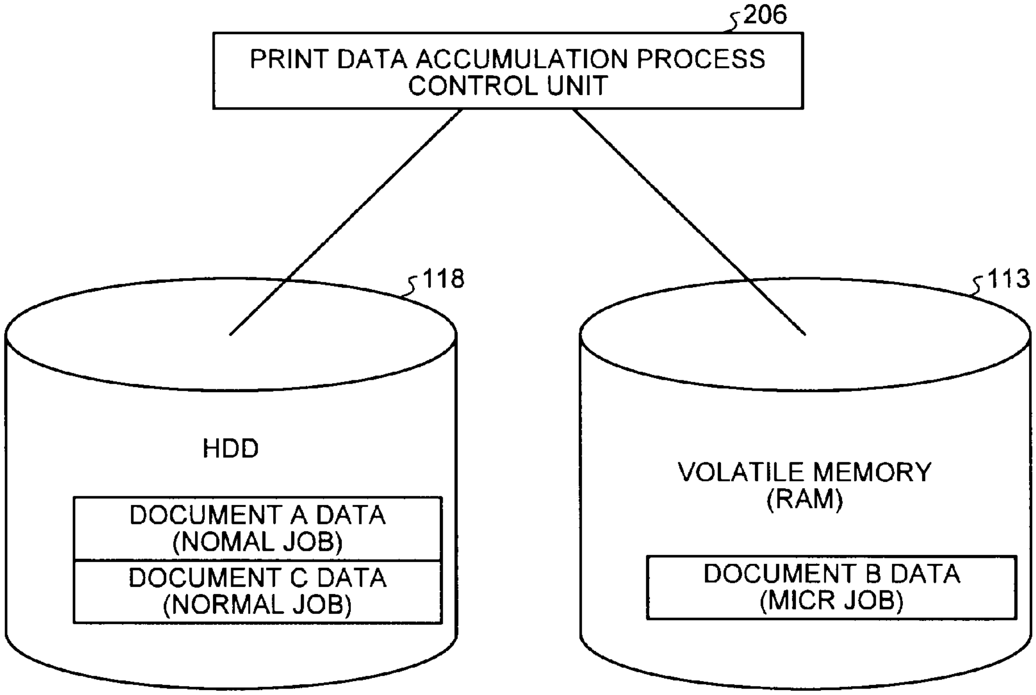
FIG. 4 is a diagram schematically illustrating a changeover of an accumulation location of print data by a print data accumulation process control unit.
FIG. 5 is a diagram illustrating a table (accumulation permission/prohibition table) used for making a decision to permit or prohibit accumulation of print data when a job type is classified into two types of a MICR job and a normal job, and an accumulation job type is classified into two types of normal print and accumulation print.

FIG. 3 is a schematic diagram schematically illustrating a second functional configuration of the printer 1 related to an image forming process. The difference between the functional configuration of FIG. 3 and the functional configuration of FIG. 2 is as follows. As illustrated in FIG. 4, when the print job is the normal job, the print data accumulation process control unit 206 accumulates print data (for example, document A data and document C data in FIG. 4) in the HDD 118. However, when the print job is the MICR job, the print data accumulation process control unit 206 accumulates print data (for example, document B data in FIG. 4) in a volatile memory (RAM 113) other than the HDD 118, reads the print data from the volatile memory, and erases the print data accumulated in the volatile memory. The remaining configurations are the same as the first functional configuration described with reference to FIG. 2, and thus the redundant description will not be repeated. The details of an operation of this configuration will be described later.

Next, various embodiments of an operation of the printer 1 will be described.

First Example

FIG. 5 illustrates a table (referred to as "accumulation permission/prohibition table") used for making a decision to permit or prohibit accumulation of print data when the job type is classified into two types of the MICR job and the normal job, and the accumulation job type is classified into two types of normal print and accumulation print. As illustrated in FIG. 5, in the case in which the job type is the MICR job, "accumulation prohibition" is specified when the accumulation job type is the normal print or when the accumulation job type is the accumulation print. In the case in which the job type is the normal job, "accumulation prohibition" is specified when the accumulation job type is the normal print, while "accumulation permission" is specified when the accumulation job type is the accumulation print.

Figures 6, 7:
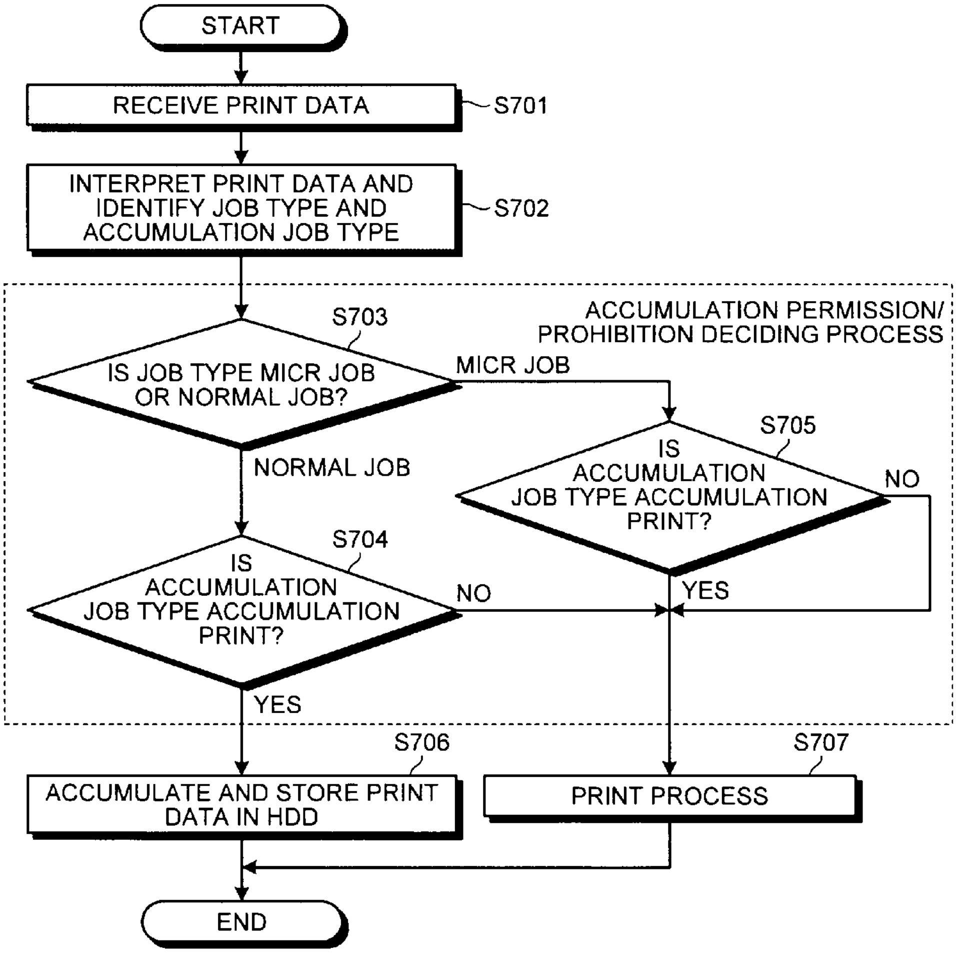
FIG. 6 is a diagram illustrating an example of an accumulation permission/prohibition table used for making a decision to permit or prohibit accumulation of print data when a job type is classified into two types of a MICR job and a normal job, and an accumulation job type is classified into five types of normal print, confidential print, test print, hold print, and stored print.
FIG. 7 is a flowchart for describing an operation when print control is performed in the first functional configuration according to the content specified in the accumulation permission/prohibition table illustrated in FIG. 5 or 6.

FIG. 6 illustrates an accumulation permission/prohibition table used for making a decision to permit or prohibit accumulation of print data when the job type is classified into two types of the MICR job and the normal job, and the accumulation job type is classified into five types of the normal print, the confidential print, the test print, the hold print, or the stored print. As illustrated in FIG. 6, in the case in which the job type is the MICR job, "accumulation prohibition" is specified when the accumulation job type is the normal print, the confidential print, the test print, the hold print, or the stored print. In the case in which the job type is the normal job, "accumulation prohibition" is specified when the accumulation job type is the normal print, while "accumulation permission" is specified when the accumulation job type is the confidential print, the test print, the hold print, or the stored print. In the example of FIG. 6, the confidential print, the test print, the hold print, and the stored print are specified as print types corresponding to the accumulation print illustrated in FIG. 5.

This example deals with a case in which print control is performed in the first functional configuration according to the content specified in the accumulation permission/prohibition table illustrated in FIG. 5 or FIG. 6. The details of the print control will be described below with reference to a flowchart of FIG. 7. In the flowchart of FIG. 7, the confidential print, the test print, the hold print, and the stored print specified in the accumulation permission/prohibition table of FIG. 6 are collectively dealt as the accumulation print.

First, in step S701, the communication control unit 201 receives print data transmitted from the host computer 2 via the host I/F 110.

Next, in step S702, the print data interpreting unit 202 interprets the print data received by the communication control unit 201 and identifies both the job type and the accumulation job type. Then, the print data interpreting unit 202 notifies the print control unit 204 of the identification results.

Then, the print control unit 204 executes an accumulation permission/prohibition deciding process so as to control accumulation or printing of the print data according to the job type and the accumulation job type notified from the print data interpreting unit 202. In the accumulation permission/prohibition deciding process, first in step S703, the job type is determined as either the MICR job or the normal job.

When it is determined in step S703 that the job type is the normal job, in step S704, it is further determined whether or not the accumulation job type is the accumulation print.

When it is determined that the accumulation job type is the accumulation print (Yes in step S704), in step S706, the print control unit 204 causes the print data accumulation process control unit 206 to accumulate and store the print data in the HDD 118. At this time, accumulated document management information whose example is illustrated in FIG. 8 is stored in the NV-RAM 115. The accumulated document management information illustrated in FIG. 8 includes a document name of a document accumulated and stored in the HDD 118, a job type, an accumulated document type corresponding to the accumulation job type (a confidential print document, a test print document, a hold print document, or a stored print document), a password (a password set to print data in the case of the confidential print document or the hold print document), an accumulated print data file name, and the like.

The accumulation job type may be set as the accumulated document type. By storing the accumulated document management information in the NV-RAM 115 when the print data is accumulated, the document name, the job type, the accumulation job type, the password, and the like are managed in association with the accumulated print data.

When it is determined that the accumulation job type is not the accumulation print (No in step S704), in step S707, the print control unit 204 executes a print process that causes the printer engine 103 to print image data from the print data rendering unit 203.

When it is determined in step S703 that the job type is the MICR job, in step S707, the print control unit 204 prohibits the accumulation of the print data and then executes the print process that causes the printer engine 103 to print image data from the print data rendering unit 203. A determining process of step S705 of FIG. 7 is one which has been described above in association with the contents of the accumulation permission/prohibition table of FIG. 5 or 6, and is unnecessary in an actual process. In FIG. 7, the accumulation permission/prohibition deciding process is performed through a series of processes (steps S703 to S705). Alternatively, the decision to permit or inhibit the accumulation may be made by acquiring accumulation permission/prohibition information corresponding to the job type and the accumulation job type notified from the print data interpreting unit 202 with reference to the accumulation permission/prohibition table illustrated in FIG. 5 or 6.

Second Example

FIG. 9 illustrates an accumulation permission/prohibition table used for making a decision to permit or prohibit accumulation of print data when the job type is classified into two types of the MICR job and the normal job, and the accumulation job type is classified into five types either the normal print, the confidential print, the test print, the hold print, or the stored print. In the example of FIG. 9, unlike the example of FIG. 6, in the case in which the job type is the MICR job, "accumulation prohibition" is specified when the accumulation job type is the normal print, the test print, or the stored print, whereas "accumulation permission" is specified when the accumulation job type is the confidential print or the hold print. In the case in which the job type is the normal job, "accumulation prohibition" is specified when the accumulation job type is the normal print, while "accumulation permission" is specified when the accumulation job type is the confidential print, the test print, the hold print, and the stored print.

Figure 10:
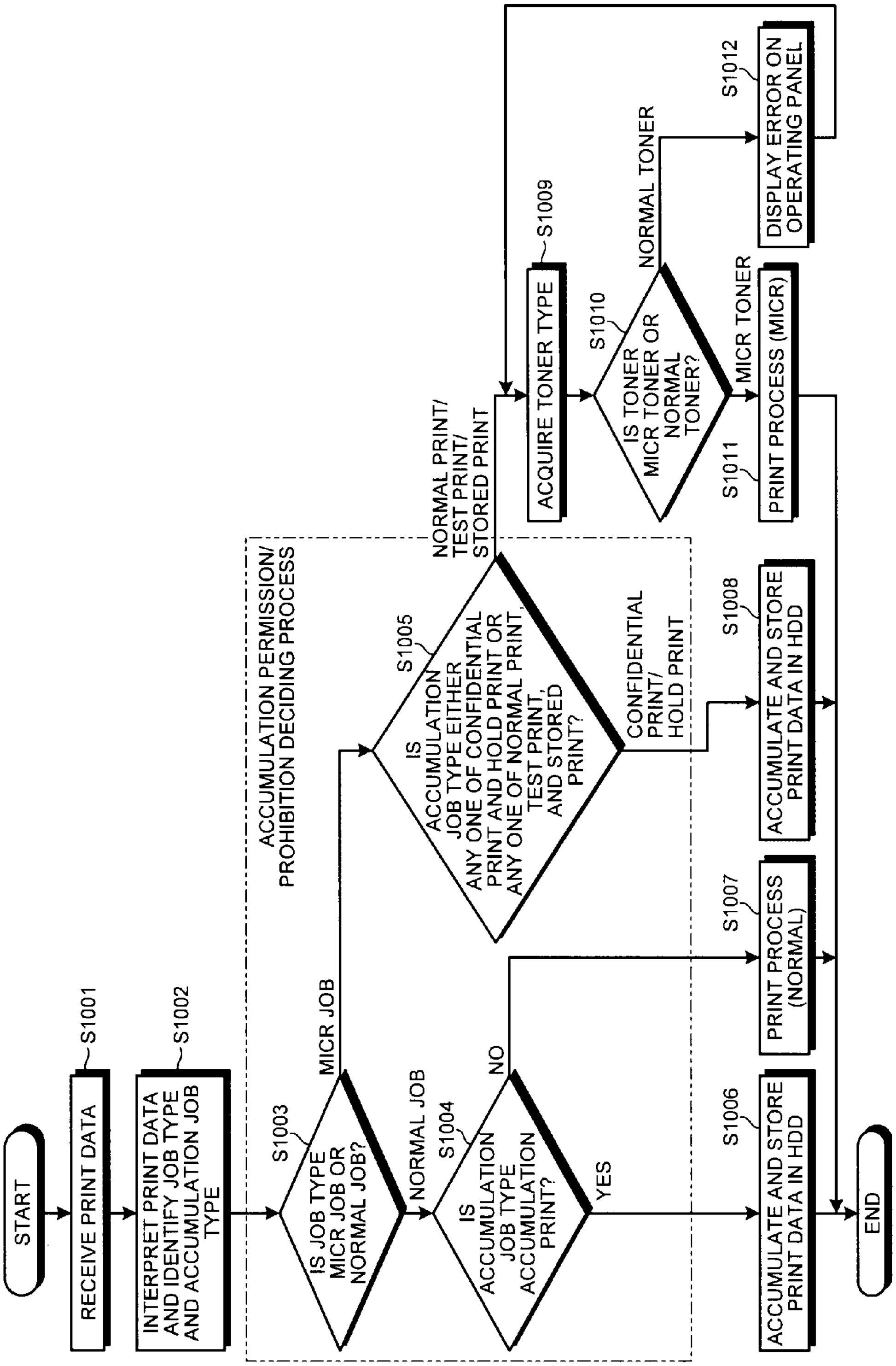
FIG. 10 is a flowchart for describing an operation according to a second example when print control is performed in the first functional configuration according to the content specified in the accumulation permission/prohibition table illustrated in FIG. 9.

This example deals with a case in which print control is performed in the first functional configuration according to the content specified in the accumulation permission/prohibition table illustrated in FIG. 9. The details of the print control according to this example will be described below with reference to a flowchart of FIG. 10. In the flowchart of FIG. 10, when the print process is performed on the MICR job, a process of reflecting an identification result by the cartridge identifying unit 205 (an identification result as to whether toner of the process cartridge 120 is MICR toner or normal toner) is performed before the print process. In FIG. 10, a process cartridge of normal toner is mounted in a normal state of the printer 1, but the process cartridge of normal toner is replaced with a process cartridge of MICR toner when MICR print is performed. In addition, when the job type is the normal job, the confidential print, the test print, the hold print, and the stored print specified in the accumulation permission/prohibition table of FIG. 9 are collectively dealt as the accumulation print.

First, in step S1001, the communication control unit 201 receives print data transmitted from the host computer 2 via the host I/F 110.

Next, in step S1002, the print data interpreting unit 202 interprets the print data received by the communication control unit 201 and identifies both the job type and the accumulation job type. Then, the print data interpreting unit 202 notifies the print control unit 204 of the identification results.

The print control unit 204 executes an accumulation permission/prohibition deciding process so as to control document accumulation or printing according to the job type and the accumulation job type notified from the print data interpreting unit 202. In the accumulation permission/prohibition deciding process, it is determined first whether the job type is the MICR job or the normal job in step S1003.

When it is determined in step S1003 that the job type is the normal job, in step S1004, it is further determined whether or not the accumulation job type is the accumulation print (here, the confidential print, the test print, the hold print, or the stored print).

When it is determined that the accumulation job type is the accumulation print (Yes in step S1004), in step S1006, the print control unit 204 causes the print data accumulation process control unit 206 to accumulate and store the print data in the HDD 118. At this time, the accumulated document management information whose example is illustrated in FIG. 8 is stored in the NV-RAM 115. By storing the accumulated document management information in the NV-RAM 115 when document data (print data) is accumulated, the job type (MICR job/normal job) is managed in association with the print data.

When it is determined that the accumulation job type is not the accumulation print (No in step S1004), in step S1007, the print control unit 204 executes a print process that causes the printer engine 103 to print image data from the print data rendering unit 203.

When it is determined in step S1003 that the job type is the MICR job, in step S1005, the print control unit 204 further determines which accumulation job type is assigned; either any one of the confidential print and the hold print or any one of the normal print, the test print, and the stored print.

When it is determined in step S1005 that the accumulation job type is either the confidential print or the hold print, the process proceeds to step S1008. In step S1008, the print control unit 204 causes the print data accumulation process control unit 206 to accumulate and store the print data in the HDD 118.

When it is determined in step S1005 that the accumulation job type is any one of the normal print, the test print, and the stored print, it is prohibited to accumulate the print data. Then, in step S1009, the print control unit 204 acquires the identification result (the toner type: MICR toner/normal toner) of the cartridge identifying unit 205 on the process cartridge 120 mounted in the printer 1. In step S1010, the print control unit 204 determines whether the toner of the process cartridge is the MICR toner or the normal toner, based on the identification result by the cartridge identifying unit 205.

When it is determined in step S1010 that the toner is the MICR toner, in step S1011, the print control unit 204 executes the print process for causing the printer engine 103 to print image data from the print data rendering unit 203. Meanwhile, when it is determined in step S1005 that the accumulation job type is either the normal print, the test print, or the stored print, particularly, when the accumulation job type is either the test print or the stored print, the print control unit 204 performs control such that a corresponding job is canceled. That is, when the job type is the MICR job and the accumulation job type is any one of the test print and the stored print, the print job is canceled without performing accumulation or printing.

When it is determined in step S1010 that the toner is the normal toner, the process proceeds to step S1012. In step S1012, the print control unit 204 controls the operating panel control unit 207 so that an error message encouraging the user to replace the process cartridge is displayed on the operating panel 102, and then places the printer on standby for process cartridge replacement (the process returns to step S1009). Thereafter, when the fact that the user has replaced the process cartridge with the MICR toner process cartridge is detected by the cartridge identifying unit 205, in step S1009, the print control unit 204 acquires the toner type. Then, it is determined in step S1010 that the toner is the MICR toner, and in step S1011, the print process is executed.

In FIG. 10, the accumulation permission/prohibition deciding process is performed through a series of processes (steps S1003 to S1005). Alternatively, the decision to permit or prohibit the accumulation of the print data may be made by acquiring accumulation permission/prohibition information corresponding to the job type and the accumulation job type notified from the print data interpreting unit 202 with reference to the accumulation permission/prohibition table illustrated in FIG. 9. In this case, by adding or changing the content of the accumulation permission/prohibition table by an administrator of the printer 1 having a predetermined right, the accumulation permission/prohibition deciding process can be appropriately and arbitrarily changed.

Next, print control when the user operates the operating panel 102 to print the accumulated print data (document) of the MICR job or the normal job will be described with reference to a flowchart of FIG. 11.

Figure 15:
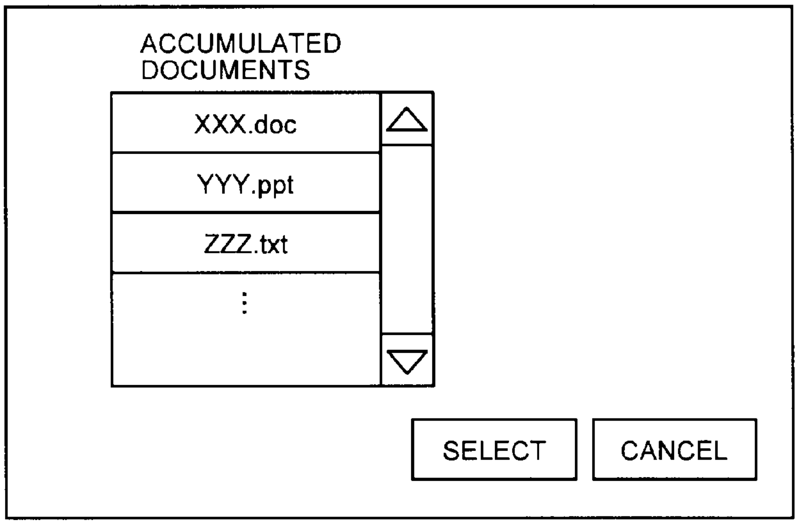
FIG. 15 is a diagram illustrating an example of an accumulated document selection screen on an operating panel.

First, in step S1101, the user selects an accumulated document through the operating panel 102 and gives a print instruction (for example, the accumulated document may be selected from an accumulated document selection screen on the operating panel 102 illustrated in FIG. 15). At this time, information (document name) of the selected document and the print instruction are notified from the operating panel control unit 207 to the print control unit 204. The accumulated print data is data accumulated in steps S1006 and S1008 of FIG. 10.

In step S1102, the print control unit 204 acquires the job type of a document to print from the accumulated document management information stored in the NV-RAM 115, based on the document name notified from the operating panel control unit 207.

Next, in step S1103, the print control unit 204 determines whether the job type acquired in step S1102 is the MICR job or the normal job.

When it is determined in step S1103 that the job type is the normal job, the process proceeds to step S1105. In contrast, when it is determined in step S1103 that the job type is the MICR job, since the accumulation job type of the document selected by the user is the confidential print or the hold print, in step S1104, an authentication process is performed.

Figure 16:
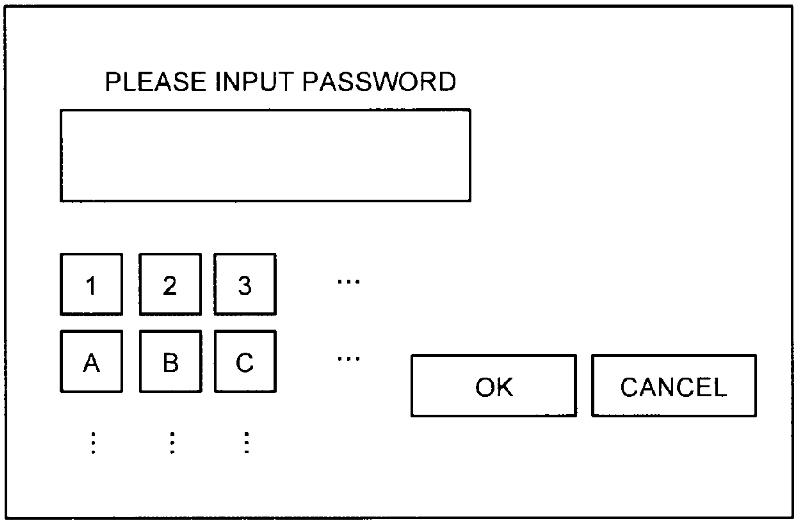
FIG. 16 is a diagram illustrating an example of a password input screen on an operating panel.

For the authentication process of step S1104, for example, a password input screen illustrated in FIG. 16 is displayed on the operating panel 102. Input password input information is compared with a password, which is set to corresponding print data, included in the document management information. When the two passwords match each other, the MICR print is permitted, and then the process proceeds to step S1105. However, when the two passwords do not match each other, a process for displaying the password input screen is performed again or an error message is displayed.

In step S1105, the print control unit 204 acquires the identification result (the toner type: MICR toner/normal toner) of the cartridge identifying unit 205 of the process cartridge 120 mounted in the printer 1.

Next, the print control unit 204 executes a print permission/prohibition deciding process for making a decision to permit or prohibit printing, based on the acquired job type and the identification result (MICR toner/normal toner) of the cartridge identifying unit 205. For the print permission/prohibition deciding process, first, in step S1106, the print control unit 204 determines whether the job type of the document to print is the normal job or the MICR job, based on information of the job type acquired in step S1102.

When it is determined in step S1106 that the job type is the normal job, in step S1107, the print control unit 204 further determines whether the toner of the process cartridge 120 is the MICR toner or the normal toner, based on the identification result by the cartridge identifying unit 205.

When it is determined in step S1107 that the toner of the process cartridge 120 is the normal toner, in step S1109, the print control unit 204 executes the print process (the normal print using the normal toner) that causes the printer engine 103 to print image data from the print data rendering unit 203.

In contrast, when it is determined in step S1107 that the toner of the process cartridge 120 is the MICR toner, the process proceeds to step S1110. In step S1110, the print control unit 204 controls the operating panel control unit 207 so that an error message encouraging the user to replace the process cartridge is displayed on the operating panel 102. In step S1111, the print control unit 204 acquires the identification result (the toner type: MICR toner/normal toner) of the cartridge identifying unit 205 on the process cartridge 120 mounted in the printer 1, and then places the printer on standby for process cartridge replacement (the process returns to step S1107). Thereafter, when the fact that the user has replaced the process cartridge with the normal toner process cartridge is detected by the cartridge identifying unit 205, in step S1111, the print control unit 204 acquires the toner type. Then, it is determined in step S1107 that the toner is the normal toner, and in step S1109, the print process (the normal print using the normal toner) is executed. As described above, when the job type is the normal job, by prohibiting the use of the MICR toner, forgery is prevented.

When it is determined in step S1106 that the job type is the MICR job, in step S1108, the print control unit 204 further determines whether the toner of the process cartridge 120 is the MICR toner or the normal toner, based on the identification result by the cartridge identifying unit 205.

When it is determined in step S1108 that the toner of the process cartridge 120 is the MICR toner, in step S1109, the print control unit 204 executes the print process (the MICR print using the MICR toner) for causing the printer engine 103 to print image data from the print data rendering unit 203. In this print process on the MICR job, when printing is completed, the printed print data stored in the HDD 118 is erased, and thus the print data is prevented from being printed more than once.

When it is determined in step S1108 that the toner of the process cartridge 120 is the normal toner, the process proceeds to step S1112. In step S1112, the print control unit 204 controls the operating panel control unit 207 so that an error message encouraging the user to replace the process cartridge is displayed on the operating panel 102. In step S1113, the print control unit 204 acquires the identification result (the toner type: MICR toner/normal toner) of the cartridge identifying unit 205 on the process cartridge 120 mounted in the printer 1, and then is on standby for process cartridge replacement (the process returns to step S1108). Thereafter, when the fact that the user has replaced the process cartridge with the MICR toner process cartridge is detected by the cartridge identifying unit 205, in step S1113, the print control unit 204 acquires the toner type. Then, it is determined in step S1108 that the toner is the MICR toner, and in step S1109, the print process (the MICR print using the MICR toner) is executed. As a result, it is prevented to accidentally perform printing by the normal toner and to output an invalid printed material.

Figure 11:
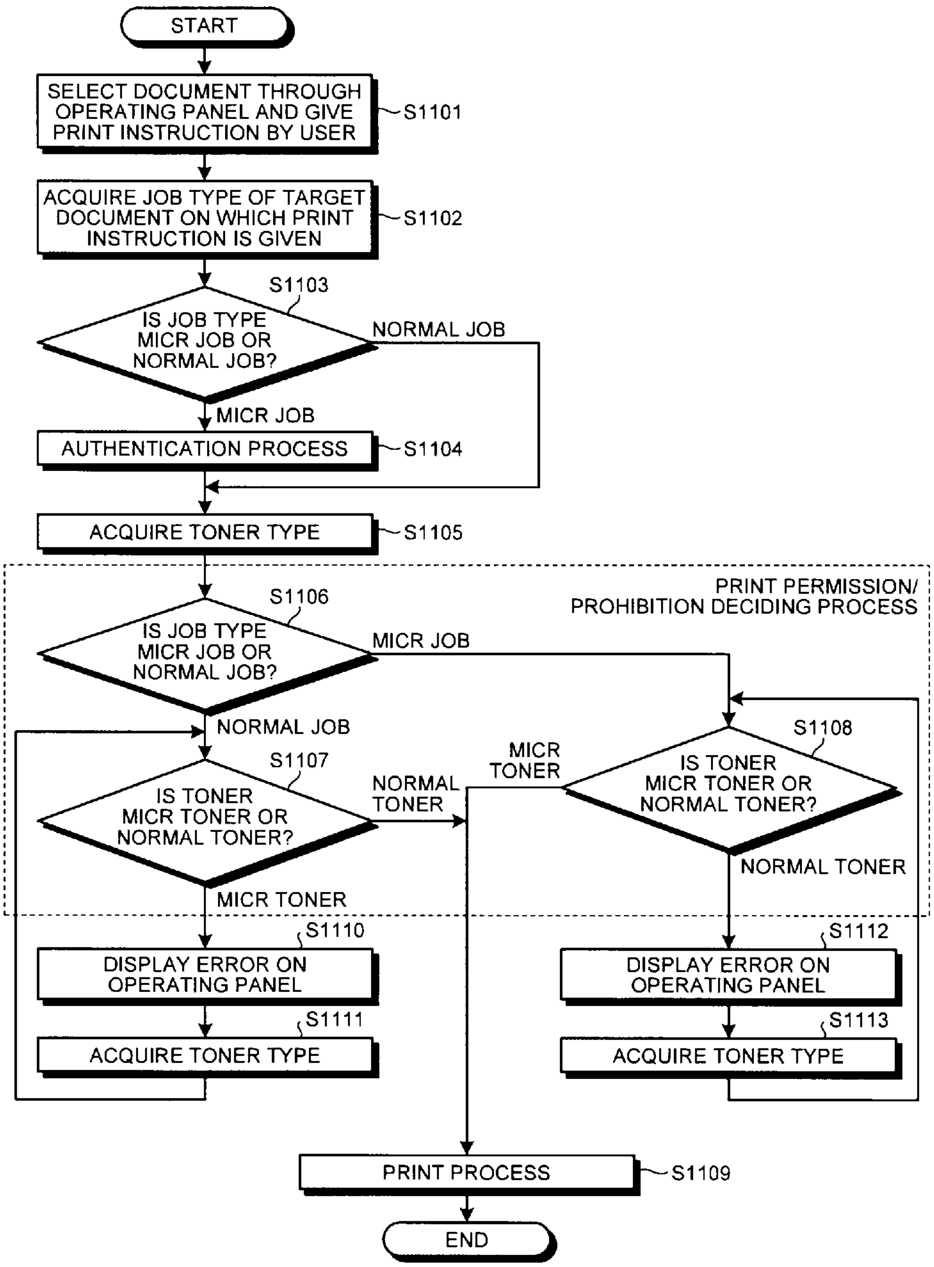
FIG. 11 is a flowchart for describing print control according to the second embodiment when a user operates an operating panel to print data (document) of an accumulated MICR job or a normal job.

In FIG. 11, the print permission/prohibition deciding process is performed through a series of processes (steps S1106 to S1108). Alternatively, the decision to permit or prohibit printing may be made by acquiring print permission/prohibition information corresponding to the job type acquired in step S1102 and the identification result (MICR toner/normal toner) of the cartridge identifying unit 205 acquired in step S1105 with reference to the print permission/prohibition table illustrated in FIG. 12.

Third Example

This example deals with a case in which print control is performed in the second functional configuration according to the content specified in the accumulation permission/prohibition table illustrated in FIG. 9. The details of the print control according to this example will be described below with reference to flowcharts of FIGS. 13 and 14.

Figure 13:
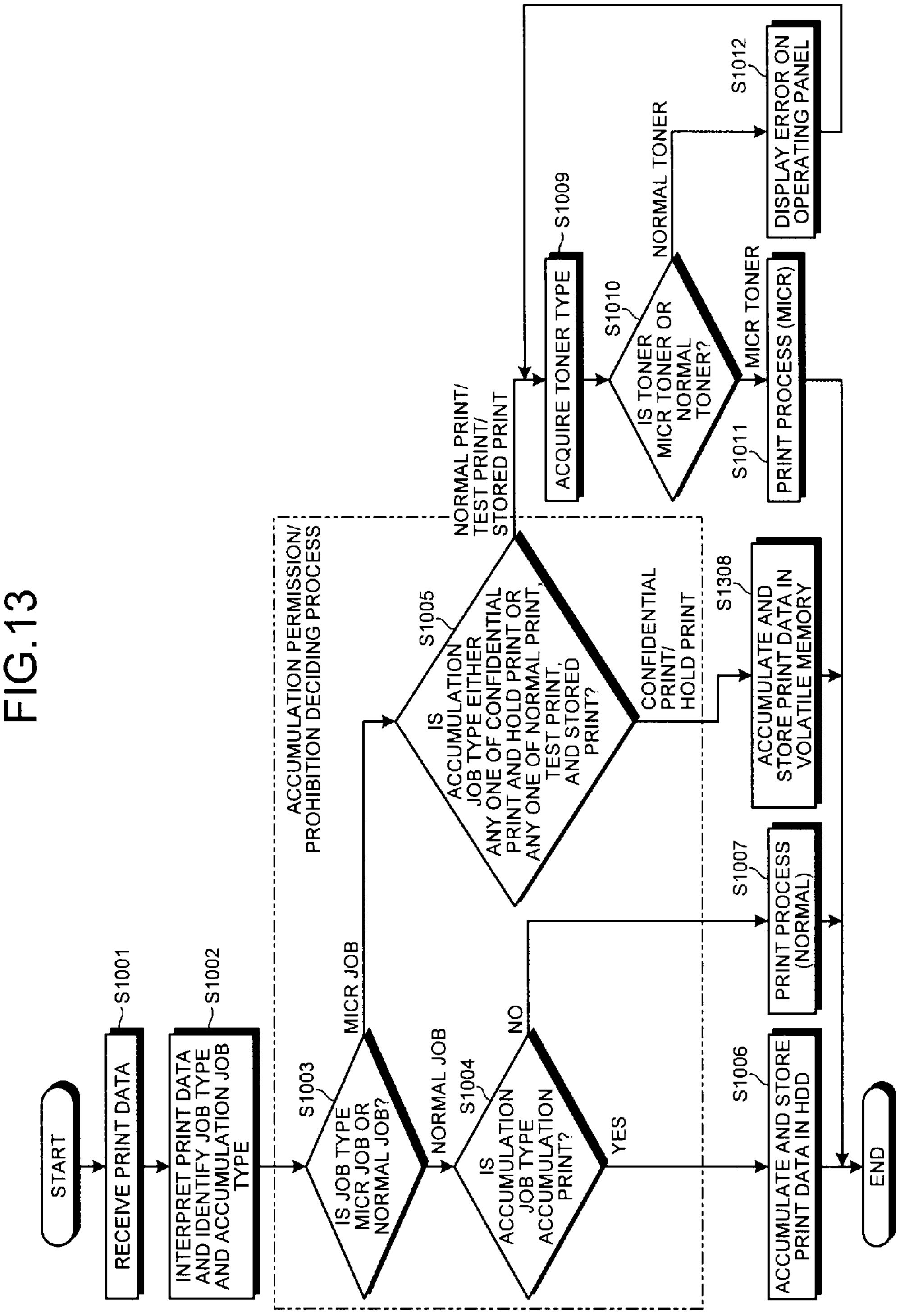
FIG. 13 is a flowchart for describing an operation according to a third example when print control is performed in a second functional configuration according to the content specified in the accumulation permission/prohibition table illustrated in FIG. 9.

The difference between the flowchart illustrated in FIG. 13 and the flowchart illustrated in FIG. 10 is as follows. In FIG. 10, when the job type is the MICR job and the accumulation job type is either the confidential print or the hold print, in step S1008, control of accumulating and storing the print data in the HDD 118 is performed. On the other hand, in this example, in step S1308 corresponding to step S1008 of FIG. 10, target print data is accumulated and stored in a volatile memory (RAM 113 or the like) instead of the HDD 118. The remaining processes are the same as the flow of the process of FIG. 10, and thus the redundant description on the same process will not be repeated. In FIGS. 10 and 13, the same processes are denoted by the same reference numeral.

Figure 14:
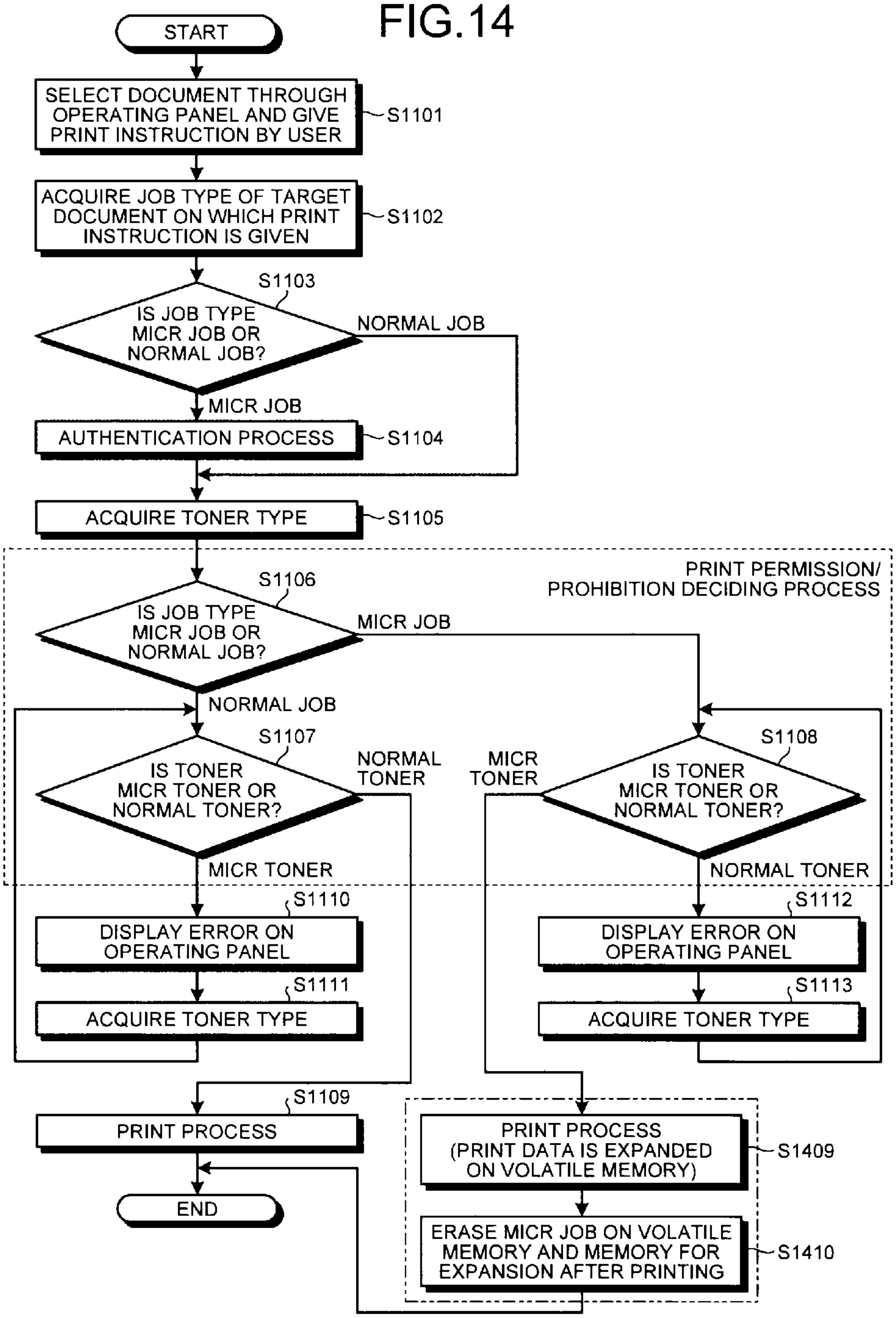
FIG. 14 is a flowchart for describing print control according to the third example when a user operates an operating panel to perform with respect to print data (document) of an accumulated MICR job or a normal job.

Further, the difference between the flowchart of FIG. 14 and the flowchart of FIG. 11 lies in that as the print process (corresponding to step S1109 in FIG. 11) performed when the job type is the MICR job and the toner of the process cartridge 120 mounted in the device is the MICR toner, in the flowchart of FIG. 14, in step S1409, performed is a print process of expanding print data into bitmap data on a volatile memory (RAM 113 or the like) functioning as a memory for expansion instead of the HDD 118 and then printing the bitmap data. In addition, after the print process, in step S1410, the print data of the printed MICR job on the volatile memory and the developed image data are erased.

In this example, as illustrated in FIG. 13, when the job type is the MICR job for performing the confidential print or the hold print, the print data is accumulated and stored in the volatile memory. In addition, as illustrated in FIG. 14, by expanding the print data into the image data using an area on the volatile memory as the memory for expansion, it is possible to prevent data leakage, at the time of disposal of the device, which may occur when the print data is accumulated and stored in the HDD 118 as in the second example. In addition, when the MICR job is completely printed once, since the print data and the memory for expansion are erased, improperly performed printing of the MICR print data remaining in a certain storage unit as in the conventional art can be prevented.

The exemplary embodiments of the present invention have been described above. However, the present invention is not limited to the above embodiments. It should be noted that the embodiments may be modified within a range not departing the gist of the present invention. The above embodiments have been described using the laser printer as an example of the image forming apparatus. However, the present invention is not limited to the laser printer. For example, the configuration or operation of the laser printer may be applied to a different kind of printer, a copying machine, an MFP including at least two of a copying function, a printer function, a scanner function, and a facsimile function, or the like.

The above embodiments have been described in connection with the case in which the control program executed by the CPU 111 of the controller 101 is embedded in the program ROM 112 in advance. However, the control program may be configured to be provided in the form recorded in a computer readable recording medium such as a compact disc-read only memory (CD-ROM), a flexible disk (FD), a compact disc recordable (CD-R), or a digital versatile disk (DVD). In addition, the control program may be configured to be stored in a computer connected to a network such as the Internet and then provided or distributed via the network such as the Internet.

According to the embodiments, the decision to permit or prohibit the accumulation of print data is made based on a first job type representing any one of a special print job using special toner such as MICR toner and a normal job using normal toner, and a second job type representing a type of a print function to use (a print function accompanied by accumulation of print data or a print function not accompanied by accumulation of print data). Thus, there is an effect capable of using the accumulation function in the special print job and the normal print job while preventing unauthorized use of the special print job that uses the print function accompanied by accumulation of print data.

In addition, data related to the special print job is accumulated or temporarily stored in the volatile memory. Unlike the case in which data is accumulated in the HDD, there is no risk of illegal printing, and a possibility that data is stolen or is leaked and then used for forgery can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a printer engine;

a storage unit that stores therein an accumulation permission/prohibition information in a corresponding manner to each combination of a plurality of first job types and a plurality of second job types, including a first job type indicating a print type of an accumulation print, which is executed based on a job and in which print data of the job is stored and printed, and including a second job type indicating whether toner to be used for execution of the job is special toner or normal toner, and the accumulation permission/prohibition information indicating whether to permit or prohibit accumulation of print data of the job;

a receiving unit that receives print data;

a print data interpreting unit that interprets the received print data received by the receiving unit so as to identify both the first job type of a job using the received print data and the second job type of the job using the received print data; and a print control unit that accumulates the received print data in a reusable manner in the storage unit when the accumulation permission/prohibition information that is stored corresponding to a combination of the first job type and the second job type identified by the print data interpreting unit indicates that the accumulation is permitted, and does not accumulate the received print data when the accumulation permission/prohibition information that is stored corresponding to a combination of the first job type and the second job type identified by the print data interpreting unit indicates that the accumulation is prohibited.

2. The image forming apparatus according to claim 1, wherein the special toner is magnetic ink character recognition (MICR) toner.

3. The image forming apparatus according to claim 1, further comprising a management information holding unit that holds management information in which information including the first job type of the received print data that is identified by the print data interpreting unit is associated with the received print data when accumulating the received print data in the storage unit, wherein when the printer engine performs printing the received print data accumulated in the storage unit, the print control unit allows the printer engine to print the received print data using any one of the special toner or the normal toner according to the management information held by the management information holding unit.

4. The image forming apparatus according to claim 1, wherein the print control unit allows the printer engine to print the received data or cancels the job for the received print data when the received print data is not accumulated in the storage unit in a reusable manner.

5. The image forming apparatus according to claim 1, further comprising a cartridge identifying unit that identifies a type of cartridge mounted in the image forming apparatus, wherein when the received print data is not accumulated in the storage unit in a reusable manner and the second job type indicates that toner to be used for execution of the job for the received print data is special toner, or when the cartridge identifying unit identifies the type of cartridge as a cartridge containing special toner, the print control unit causes the printer engine to print the received print data, and when the cartridge identifying unit identifies the type of cartridge as a cartridge containing normal toner, the print control unit executes an error processing.

6. The image forming apparatus according to claim 1, further comprising:

a volatile memory; and a nonvolatile memory, wherein when the received print data is accumulated in the storage unit in a reusable manner, or when the second job type indicates that toner to be used for execution of the job for the received print data is special toner, the print control unit causes the received print data to be stored in the volatile memory, and when the second job type indicates that toner to be used for execution of the job for the received print data is normal toner, the print control unit causes the received print data to be stored in the nonvolatile memory in a reusable manner.

7. The image forming apparatus according to claim 1, wherein the print type of the accumulation print includes at least one of a confidential print, a test print, a hold print, and a stored print.

8. An image forming method performed in an image forming apparatus that includes a storage unit, a receiving unit, a print data interpreting unit, and a print control unit, the image forming method comprising:

storing, in the storage unit, an accumulation permission/prohibition information in a corresponding manner to each combination of a plurality of first job types and a plurality of second job types, including a first job type indicating a print type of an accumulation print, which is executed based on a job and in which print data of the job is stored and printed, and including a second job type indicating whether toner to be used for execution of the job is special toner or normal toner, and the accumulation permission/prohibition information indicating whether to permit or prohibit accumulation of print data of the job;

receiving, with the receiving unit, print data;

interpreting, with the print data interpreting unit, the received print data received by the receiving unit so as to identify both the first job type of a job using the received print data and the second job type of the job using the received print data; and with the print control unit, accumulating the received print data in the storage unit when the accumulation permission/prohibition information that is stored corresponding to a combination of the first job type and the second job type identified by the print data interpreting unit indicates that the accumulation is permitted, and not accumulating the received print data when the accumulation permission/prohibition information that is stored corresponding to a combination of the first job type and the second job type identified by the print data interpreting unit indicates that the accumulation is prohibited.

9. The image forming method according to claim 8, wherein the print type of the accumulation print includes at least one of a confidential print, a test print, a hold print, and a stored print.

10. A computer program product comprising a non-transitory computer-readable medium having computer-readable program codes embodied in the medium, the program codes when executed causing a computer used in an image forming apparatus to execute:

storing, in a storage unit, an accumulation permission/prohibition information in a corresponding manner to each combination of a plurality of first job types and a plurality of second job types, including a first job type indicating a print type of an accumulation print, which is executed based on a job and in which print data of the job is stored and printed, and including a second job type indicating whether toner to be used for execution of the job is special toner or normal toner, and the accumulation permission/prohibition information indicating whether to permit or prohibit accumulation of print data of the job;

receiving print data;

interpreting the received print data so as to identify both the first job type of a job using the received print data and the second job type of the job using the received print data; and accumulating the received print data in the storage unit when the accumulation permission/prohibition information that is stored corresponding to a combination of the first job type and the second job type indicates that the accumulation is permitted, and not accumulating the received print data when the accumulation permission/prohibition information that is stored corresponding to a combination of the first job type and the second job type indicates that the accumulation is prohibited.

11. The computer program product according to claim 10, wherein the print type of the accumulation print includes at least one of a confidential print, a test print, a hold print, and a stored print.

* * * * *